US012558842B2

(12) United States Patent     (10) Patent No.:   US 12,558,842 B2
Jahnle et al.     (45) Date of Patent:     Feb. 24, 2026

(54) PRINTHEAD FOR A 3D PRINTER AND A METHOD FOR FILLING A PRINTHEAD

(71) Applicant: Robert Bosch GmbH, Stuttgart (DE)

(72) Inventors: Hendrik Jahnle, Leutenbach (DE);
         Thilo Schneider, Neuhausen (DE)

(73) Assignee: Robert Bosch GmbH, Stuttgart (DE)

( * ) Notice: Subject to any disclaimer, the term of this patent is extended or adjusted under 35 U.S.C. 154(b) by 277 days.

(21) Appl. No.: 18/550,712

(22) PCT Filed: Mar. 11, 2022

(86) PCT No.: PCT/EP2022/056307
     § 371 (c)(1),
     (2) Date: Sep. 15, 2023

(87) PCT Pub. No.: WO2022/194693
     PCT Pub. Date: Sep. 22, 2022

(65) Prior Publication Data
     US 2024/0190069 A1     Jun. 13, 2024

(30) Foreign Application Priority Data
     Mar. 18, 2021    (DE) ..................... 10 2021 202 625.7

(51) Int. Cl.
     *B29C 64/209*      (2017.01)
     *B29C 64/295*      (2017.01)
     (Continued)

(52) U.S. Cl.
     CPC .......... *B29C 64/209* (2017.08); *B29C 64/295* (2017.08); *B29C 64/321* (2017.08); *B33Y 40/00* (2014.12); *B33Y 30/00* (2014.12)

(58) Field of Classification Search
     CPC ................ B29C 64/209; B29C 64/295; B29C 64/321; B29C 64/329; B29C 64/106;
         (Continued)

(56) References Cited

U.S. PATENT DOCUMENTS 3,980,208 A  *  9/1976   Hehl ....................... B29C 31/02
                                                  432/58
2002/0029094 A1    3/2002   Koreishi
                 (Continued)

FOREIGN PATENT DOCUMENTS

DE      102016222306 A1    5/2018
DE      102016222566 A1  *   5/2018   .......... B29C 64/118
                 (Continued)

OTHER PUBLICATIONS

Translation of International Search Report for Application No. PCT/EP2022/056307 dated Jun. 20, 2022 (2 pages).
Non-final Office Action issued by the U.S. Patent Office for U.S. Appl. No. 18/550,704 dated Aug. 1, 2025 (17 pages).

*Primary Examiner* — Galen H Hauth
*Assistant Examiner* — Mohamed K Ahmed Ali
(74) *Attorney, Agent, or Firm* — Michael Best & Friedrich LLP

(57)                 ABSTRACT

The invention relates to a printhead (100) for a 3D printer, comprising
     an actuator device (110) which is arranged in a housing (1) of the printhead (100) for actuating a piston (3), a supply device (2) for a printable material (10), a flange (5) which is arranged on the housing (1) and the supply device (2) and which comprises a cooling device (50), a nozzle head (6) with heating elements (61, 63) in order to convert the material (10) from a solid phase (10) to a liquid phase (12), and a nozzle (8) for discharging the liquid phase (12) of the material (10) out of the nozzle head (6).
According to the invention, the solid phase (10) of the material has granulate particles (10) and the supply device (2) has a blowing device (25) for releasing the granulate particles (10) from one another.
The invention additionally relates to a method (210) for filling a printhead (100), wherein a heatable cavity (40) of (Continued)

the printhead (100) is filled with printable material (10) by means of the supply device (2).

9 Claims, 7 Drawing Sheets

(51) Int. Cl.

| | | |
|---|---|---|
| *B29C 64/321* | (2017.01) | |
| *B33Y 30/00* | (2015.01) | |
| *B33Y 40/00* | (2020.01) | |

(58) Field of Classification Search
CPC ....... B29C 48/02; B29C 48/05; B29C 48/143; B29C 48/266; B29C 48/288; B29C 48/475
See application file for complete search history.

(56) References Cited

U.S. PATENT DOCUMENTS

| | | | |
|---|---|---|---|
| 2016/0082627 A1 | 3/2016 | Kilim et al. | |
| 2019/0263064 A1 | 8/2019 | Von Burg et al. | |
| 2020/0039146 A1 * | 2/2020 | Jahnle | B29C 64/209 |
| 2020/0238602 A1 | 7/2020 | Normile et al. | |

FOREIGN PATENT DOCUMENTS

| | | | | |
|---|---|---|---|---|
| DE | 102019217113 A1 * | 9/2020 | ............ | B29C 48/05 |
| JP | H0166404 U | 4/1989 | | |
| JP | H07125024 A | 5/1995 | | |
| JP | 2000043983 A | 2/2000 | | |
| JP | 2019533593 A | 11/2019 | | |
| JP | 2020157598 A | 10/2020 | | |
| WO | 2018086792 A1 | 5/2018 | | |

* cited by examiner

PRINTHEAD FOR A 3D PRINTER AND A METHOD FOR FILLING A PRINTHEAD

BACKGROUND

The present invention relates to a printhead for a 3D printer and a method of filling a printhead.

A 3D printer for a material that varies in viscosity receives a solid phase of said material as the starting material, generates a liquid phase therefrom, and selectively brings this liquid phase to the points associated with the object to be produced. Such a 3D printer comprises a printhead, in which the starting material is made ready for printing. Furthermore, means are provided for generating a relative movement between the printhead and the work surface on which the object is to be created. Either the printhead only, the work surface only, or both the printhead and the work surface can be moved.

The printhead has a first operating state in which liquid material exits from it and a second operating state in which no liquid material exits from it. For example, the second operating state is assumed when another position on the work surface is approached and no material is to be discharged on the way. For example, switching can be done between the two operating states of the printhead, in that the forward drive of the solid starting material can be switched on or off.

The most common is fused deposition modeling (FDM), in which a filament is melted from the starting material in an electrically heated extruder nozzle and discharged layer by layer on a platform. In the form of such a filament, the starting material is very expensive.

US 2016/082 627 A1 proposes feeding the starting material into granule form and conveying with screw conveyor to a heated zone from which it exits in plastic form. On the one hand, granules are significantly cheaper, and on the other hand, mixtures of different thermoplastic materials can be easily produced in this way.

Further, a printhead is known from DE 102016222306 A1, wherein a granule is plasticized therein via a piston and a heated path. As the piston presses on the granule, it is compressed and conveyed to a plasticization zone at the bottom of the printhead. The supply of the granulate takes place via a funnel-shaped inlet, wherein the granulate particles can only slip and jam within the funnel due to gravity.

SUMMARY

The invention is based on the object of providing a compact printhead for a 3D printer that allows trouble-free filling and thereby a stable printing process, as well as a method for filling the printhead.

In the context of the invention, a printhead for a 3D printer was developed. Furthermore, a method of filling a printhead has been developed.

The printhead for a 3D printer comprises an actuator device arranged in a housing of the printhead for actuating a piston, a supply device for a printable material, a flange which is arranged on the housing and the supply device and which comprises a cooling device, a nozzle head with heating elements in order to convert the material from a solid phase to a liquid phase, and a nozzle for discharging the liquid phase of the material from the nozzle head.

According to the invention, the solid phase of the material has granulate particles and the supply device has an injection device for releasing the granulate particles from one another.

The injection device of the supply device thereby prevents a jamming of the granulate particles, thereby preventing a clogging of the supply device and thereby provides a secure filling of the printhead with granulate in an advantageous manner. Furthermore, smaller diameters can be used in the inlet of the supply device, which can advantageously represent a compact printhead.

The actuator device for actuating the piston can be an electric motor, for example, with a mechanical transmission, or a hydraulic drive with a hydraulic pressure source.

An electric motor as an actuator device has a lower weight compared to a hydraulic drive and thus advantageously provides for a high dynamic of the entire printer and the printing process, since less mass must be accelerated.

A hydraulic drive advantageously achieves high forces when actuating the piston.

The supply device for the printable material can in particular be used as a supply for a material present as granules, or starting material. The starting material can in particular be a thermoplastic material.

It has been found that by using granules as the starting material over printheads using filaments made of thermoplastic material, specific advantages are achieved, particularly in the cost for the starting materials of the printer.

Compared to a printhead carrying granules with an auger, the printhead according to the invention can be constructed more compactly. This in turn results in the printhead being lighter and easier to move. This is particularly advantageous if the printhead is to be moved very quickly, in particular at speeds of 100 mm/s or more.

The flange comprises a cooling device, wherein an optimized thermal management is achieved in the area of the supply device, so that gluing of the material or the granules on the piston is advantageously avoided. Furthermore, the nozzle head has heating elements for converting the material from a solid phase, in particular granules, into a liquid phase. The heating elements in the nozzle head advantageously ensure the targeted introduction of the heating power into the material to be melted. The liquid phase, or melting can subsequently be discharged through the nozzle head by piston motion.

The printhead has a separate piston liner for guiding the piston that allows the piston to be guided directly in the piston bushing and no longer in the housing or cylinder of the printhead. Thus, it is advantageously achieved that possible wear no longer occurs directly on the inner wall of the housing or the cylinder, but within the piston bushing. The piston bushing as a separate component offers the advantage that it can be replaced if necessary. In addition, it is possible to use matched pistons and piston bushings with different diameters without further design modifications, for example to the flange and the nozzle head.

In a further development, the injection device comprises a pneumatic valve and an air duct.

The air duct is arranged in a further development in a housing part of the supply device and opens in a lower area of the supply device above an opening cross-section of the flange.

In a preferred further development of the invention, air pulses can be applied to the air duct by the pneumatic valve, wherein the air pulses act on the granules in the lower area in such a way that they separate from one another.

Further, the invention relates to a method for filling the printhead according to the invention, wherein a heatable cavity of the printhead is filled with printable material by the supply device.

Filling the cavity with printable material by the supply device comprises at least the following steps:

filling the granulate pieces into the printhead via an opening of the supply device, and generating air pulses to detach the granules from each another.

In a further development, the filling of the granulate pieces is carried out manually or automatically, wherein the granulate pieces slide into the lower area of the supply device due to the influence of gravity.

In a preferred further development of the method, the generation of air pulses is carried out at intervals and the granulate pieces are flung up in the area of the air pulses in such a way that, when they fall down again, they exert an impulse on the underlying granulate pieces and encourage them to slide into the heated cavity of the printhead.

The process of effective refilling requires blowing behind the granules, which creates an effect of lifting the granules so that they subsequently slide into the printhead. The spinning or whirling up is necessary for an automated application and the resulting gravity impulse or impact causes the granules to slip in an advantageous manner. If necessary, the air pulses can also be used to loosen jammed granules, thus advantageously avoiding downtimes of the printhead.

An opening, or opening cross-section, is arranged in an upper partial area of the piston bushing, which allows material to be fed from the supply device into the piston bushing. In the lower area of the opening is a gate, which is formed at an obtuse angle to the inner surface of the piston bushing. The gate area is hardened, or alternatively designed as a separate hardened insert. When the piston closes the opening, material or granules are sheared off from the piston at the gate, causing a strong mechanical load to act on this part of the piston bushing. The separate piston bushing and the hardened area of the gate advantageously provide a longer service life and faster replacement of a defective component.

The piston comprises a first piston part for connecting to the actuator device, a piston head for connecting to the first piston part, and for receiving the piston needle. The first piston part is preferably designed as a hollow aluminum piston, wherein coolant can be passed through the first piston part, thereby achieving piston cooling in an advantageous manner. The piston head has an underside on the side facing the nozzle, wherein the piston needle protrude from the center of the underside. The area of the bottom of the piston head minus the virtual area of the piston needle forms a piston area for generating pressure on the material. The underside of the piston head is cooled by the piston cooling and thus locally reduces the viscosity of the melt or the plastic material at the piston crown. This prevents liquid melt from flowing in the direction of the drive device, which advantageously prevents jamming of the piston in the piston bushing as well as penetration of the melt into the drive device. In addition, the material detaches more easily from the piston crown or the underside of the piston head when it is retracted, so that when the piston reaches a starting point, it can be easily refilled with material in a solid phase or granules without residual material sticking to the piston crown.

A temperature sensor is preferably mounted on the underside of the piston head or on the piston crown. Due to this arrangement of the temperature sensor, a piston position-dependent thermal management of the printhead is possible, wherein a faster heating of the material is achieved without the melt coming into contact with the underside of the piston head. This can advantageously accelerate a filling process of the printhead.

The piston head is designed as a cylindrical component and is preferably made of a thermally resistant material. The combination of the first piston part being made of aluminum and the piston head being made of steel, for example, proves to be advantageous, as the piston thus has an elastic upper area for absorbing the mechanical stresses and a thermally resistant lower area in the area of the heated material.

Depending on the piston position, the piston needle projects only partially into or completely through the bore of a pocket piece, wherein the piston needle is guided in the centric bore of the pocket piece in an advantageous manner.

The pocket piece has concentrically arranged openings, wherein these form a fluidic connection between a cavity arranged in the piston bushing and a melt cavity arranged in a lower part of the nozzle head.

The cavity is located inside the piston bushing and is formed by a volume whose outer surface is formed by the inside of the piston bushing, the outside of the piston needle, the top of the pocket piece and the bottom of the piston.

Inside the cavity, the material, or the granules, are solidified by the movement of the piston over the underside of the piston head, or the piston surface. During the solidification of the material, the thermal management of the printhead is set in such a way that no liquid phase of the material, or no melt, is formed inside the cavity, but the material is formed as a plastic phase. This advantageously ensures that no plasticized material adheres to the underside of the piston. However, during solidification, part of the liquid phase, or melt, in the melt cavity is forced out of the melt cavity into the cavity of the piston bushing through the concentrically arranged openings of the pocket piece by the piston needle entering the melt cavity. In the process, parts of the melt mix with parts of the plastic phase. In this process, the melt releases energy into the plastic phase, which advantageously produces a more homogeneous material. The pocket piece thus forms a mixer, or a static mixer, since apart from the piston movement in an advantageous manner no other moving parts are required for mixing the plastic phase with the liquid phase. The configuration of the pocket piece thus advantageously provides an aperture effect, which leads to better mixing of the material, or the melt with the plasticized material.

The pocket piece conducts the heating energy of the heating element from the nozzle head into both the melt and the piston needle, which advantageously provides improved energy management when heating the melt.

The pocket piece can be configured as a separate component in a first configuration or can be formed in one-piece with the piston bushing in a second configuration.

Starting from the upper partial area of the piston bushing via the pocket piece to the nozzle, the printhead has different state zones, wherein the state zones represent an aggregate state of the material as a function of its temperature $T_S$. In this case, the aggregate state of the material can be changed across the state zones from a solid phase to a plastic phase to a liquid phase.

The state zones of the printhead comprise a cold zone with material in solid phase, a plasticizing zone with material in plastic phase, a melting zone and a process zone in each case with material in liquid phase, and a mixing zone with material in plastic and liquid phase.

The cooling device in the flange and the piston cooling system integrated in the piston are designed to keep the temperature $T_S$ of the plastic phase of the material in the plasticizing zone below a glass transition temperature $T_g$, above which the material would plasticize and change into a liquid phase.

This is equivalent to the piston crown being in contact only with the solid phase of the material and not with a fully plasticized phase. The fully plasticized phase has a tough, sticky consistency with a high tendency to surface adhesion. If the piston comes into contact with this phase, it can stick to it, which impedes, for example, the trickling of fresh granules when the piston is retracted. This effect is avoided in an advantageous way.

A pressure sensor for the pressure $p_L$, and/or a temperature sensor for the temperature $T_L$ of the liquid phase is arranged in the melting cavity.

The measurement of the pressure $p_L$ is the primary parameter that determines the output, or discharge, or mass flow of melt from the outlet opening. An additional measurement of the temperature $T_L$ makes it possible to take into account the temperature dependence of the viscosity of the material when determining the mass flow Q. The piston advance allows the quantity to be metered to be precisely controlled. For the quality of the manufactured component, or object, the control of the temperature $T_L$, especially in the form of a constant and accurate regulation, is even more important to avoid thermal degradation of the material.

Further, a displacement measuring system for the position s of the piston, and/or a sensor for the force F exerted by the piston on the material or for a hydraulic pressure $p_H$ exerted on the piston, is provided on the actuator device and/or on the piston.

The advancing of the piston is a measure of the amount of material to be discharged. This quantity can be controlled, among other things, via the displacement measuring system. Furthermore, the force F correlates directly with the pressure in the material.

In addition, a temperature sensor for the temperature $T_K$ of the plastic phase of the material is arranged on the piston, in particular on the underside of the piston head of the piston.

Due to this arrangement of the temperature sensor, a piston position-dependent thermal management of the printhead is possible, wherein a faster heating of the material is achieved without the melt coming into contact with the underside of the piston head. This can advantageously accelerate a filling process of the printhead or reduce the time required for the filling process.

Further, a control and regulation unit is provided for active regulation of the actuator device for moving the piston according to an operating strategy to be executed for filling and printing, and for active regulation of the temperatures of the heating elements of the nozzle head.

Further, an evaluation unit is provided to evaluate the measured values of the sensors and to pass the results on to the control and regulation unit for active control of the actuator device and for active control of the heating elements.

By recording and evaluating the sensor values as a function of the respective operating states, it is possible to check the functionality of the printhead, wherein errors or deviations in the process can be displayed in an advantageous manner at an early stage. Furthermore, defined target values can be controlled by the acquisition of the sensor values. It is also possible that correction factors are calculated and transmitted to the control and regulation unit. These can be added to the target values, for example, to advantageously achieve a desired and constant output of the melt from the nozzle.

Active regulation of the heating elements enables dynamic regulation of the temperature, which advantageously influences both heating and cooling. For example, if the heating energy of the first heating element is reduced by the control and regulation unit, the cooling in the flange continues and this extracts the energy from the plastic phase of the material, causing it to cool abruptly.

Further measures improving the invention are described in more detail below on the basis of the figures, together with the description of the preferred embodiment examples of the invention.

BRIEF DESCRIPTION OF THE DRAWINGS

Shown are.

DETAILED DESCRIPTION

Figure 1:
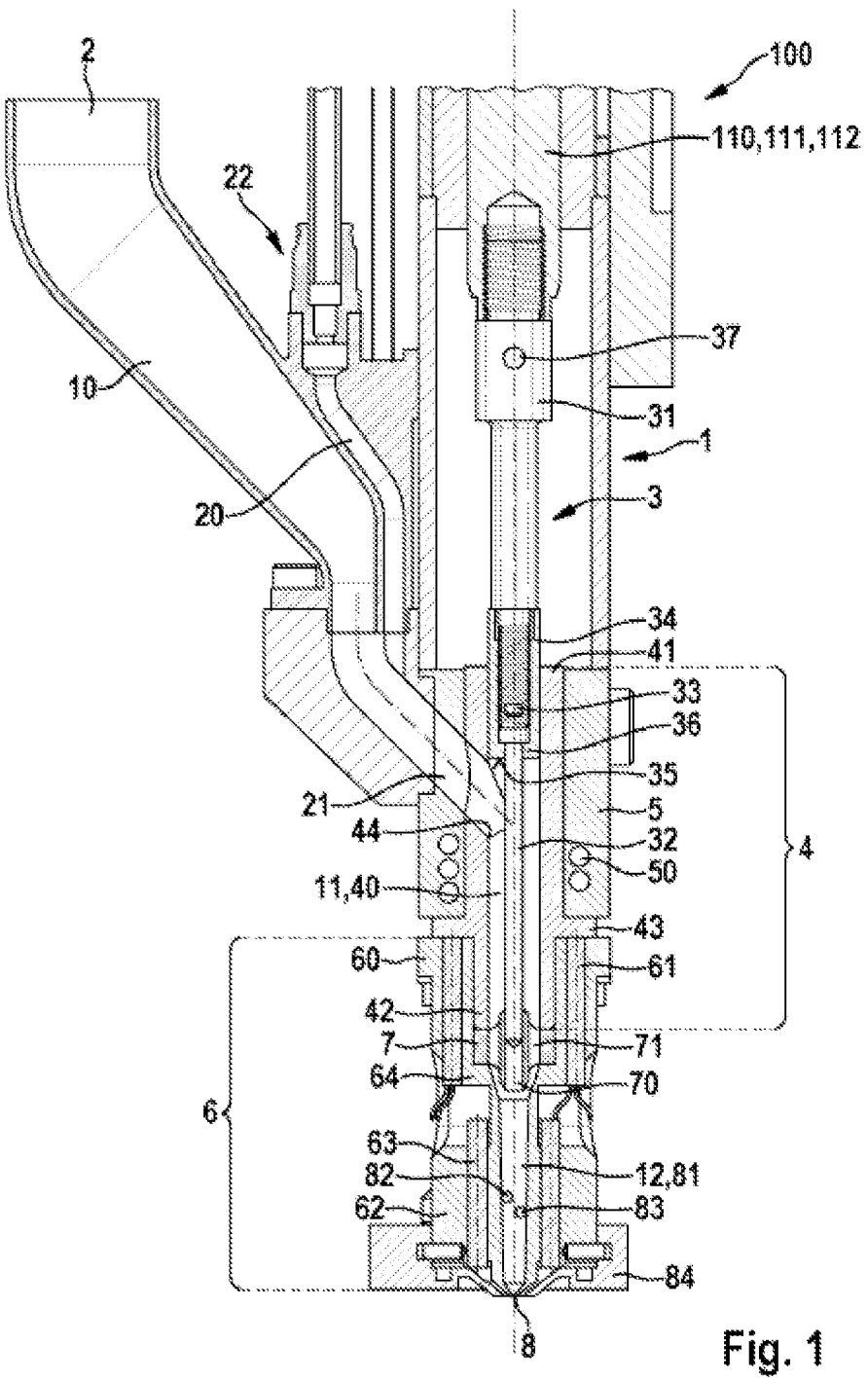
FIG. 1 a printhead according to the invention.

FIG. 1 shows a printhead 100 for a 3D printer, comprising an actuator device 110 which is arranged in a housing 1 of the printhead 100 for actuating a piston 3, a supply device 2 for a printable material 10, a flange 5 which is arranged on the housing 1 and the supply device 2 and which comprises a cooling device 50, a nozzle head 6 with heating elements 61, 63 in order to convert the material 10 from a solid phase 10 to a liquid phase 12 via a plastic phase 11, and a nozzle 8 for discharging the liquid phase 12 of the material 10 out of the nozzle head 6. The printhead 100 comprises a separate piston bushing 4 for guiding the piston 3.

The flange 5, which is internally cooled by the cooling device 50, provides thermal separation of the lower heated area of the printhead 100 from the actuator device 110, or from the drive of the piston 3.

The piston 3 comprises a first piston part 31 for connecting the piston 3 to the actuator device 110, a piston head 34 attached to the first piston part 31 and receiving a piston needle 32 in the direction of the nozzle 8. A temperature sensor 36 for measuring the temperature $T_K$ of the plastic phase 11 of the material is arranged on the piston 3, or on an underside 35 of the piston head 34. The underside 35 of the piston head 34 forms a piston crown 35. The first piston part 31 is preferably designed as a hollow aluminum piston, wherein the interior of which has a cavity that is designed as a cooling duct. A piston cooling 33 is arranged at the lower end of the first piston part 31 and is cooled by a coolant system.

The piston cooling 33 ensures solidification of the material 11, 12 at the piston crown 35 and thereby seals the piston 3 in the direction of the actuator device 110, or thereby prevents liquid melt 12 from flowing in the direction of the actuator device 110. Preferably, a cooling liquid is used as the coolant, wherein this is conveyed through the housing 1 into a cooling port 37 of the first piston part 31 via ports and flexible lines.

The cooling device 50 in the flange 5 is supplied with coolant by the same coolant system.

The cooling of the material 11, 12 at the piston crown 35 locally reduces the viscosity of the material 11, 12, causing it to detach from the piston 3 when it is retracted without drawing threads. This creates space for new material 10.

FIG. 1 shows the piston 3 in an initial position for filling the printhead 100 with printable material 10, which is fed into the printhead 100 via the supply device 2.

The supply device 2 is funnel-shaped, wherein the material 10, which is preferably a granulate, is filled from above into an opening 23 of the supply device 2. The material 10 reaches an opening 21, or opening cross-section, to the piston bushing 4 by gravity. In the lower region 24 of the supply device 2 above the opening cross-section 21, an air duct 20 of an injection device 25 for releasing granulate pieces 10 from each another is arranged. Air pulses 26 are applied to the air duct 20 by a pneumatic valve 22. The injection device 25 comprises the pneumatic valve 22 and the air duct 20, wherein the granules 10 are subjected to air blasts at intervals in such a way that the granules 10 are propelled in the direction of the area of the supply device 2 located further upstream and the individual granule pieces 10 are thereby detached from one another. When the injection device 25 is switched off, the granules 10 located in the lower area 24 of the supply device 2 fall into a cavity 40 of the piston bushing 4 when the opening cross-section 21 is open.

The injection device 25 of the supply device 2 thereby prevents jamming of the granulate pieces 10, which prevents clogging of the supply device 2, and it ensures reliable filling of the piston bushing 4 with granulate 10. Furthermore, smaller diameters can be used in the inlet of the supply device 2.

The piston bushing 4 has an upper partial area 41 projecting into the flange 5 and a lower partial area 42 projecting into an upper partial area 60 of the nozzle head 6. A stop 43 is arranged between the upper 41 and lower 42 partial areas of the piston bushing 4, by means of which the flange 5 and the nozzle head 6 are separated from each other. The opening 21, or opening cross-section, is arranged in the upper partial area 41 of the piston bushing 4 and has a gate 44 on the inner surface of the piston bushing 4. The gate 44 causes granules 10 to be sheared off between the gate 44 and the piston crown 35 when the opening cross-section 21 is closed by the piston 3, until the piston crown 35 reaches a position below the gate 44.

The piston bushing 4 has an obtuse angle at the gate 44, wherein this is sharp-edged and hardened. Local curing is an advantage here. In an alternative embodiment, the gate 44 can also be formed by a separate insert, analogous to a turning plate.

The design of the gate 44 advantageously ensures a reduction in the forces required to shear off the granules 10, thus saving energy and making the materials of the piston bushing 4 and the piston 3 less susceptible to wear. The edge of the gate 44 is extremely susceptible to wear.

A pocket piece 7 is arranged on the lower partial area 42 of the piston bushing 4, wherein the pocket piece 7 has a centrally extending bore 70 for receiving a piston needle 32 of the piston 3.

The pocket piece 7 also has concentrically arranged openings 71, which form a fluidic connection between a cavity 40 arranged in the piston bushing 4 and a melt cavity 81 arranged in a lower part 62 of the nozzle head 6. The cavity 40 is located inside the piston bushing 4 and is formed by the inside of the piston bushing 4, the outside of the piston needle 32, the top of the pocket piece 7 and the bottom 35 of the piston 3.

A preferred task of the pocket piece 7 is to conduct heat, or energy, from the heating elements 61, 63 of the nozzle head 6 into the liquid phase 12 of the material, or melt 12. This is achieved in particular by increasing the contact area with the cavity 40 and thus the plastic phase 11 of the material.

Another task is to guide the piston needle 32, wherein the contact of the piston needle 32 within the bore 70 additionally ensures that the piston needle 32 is heated to the required process temperature. The final process temperature is only reached in the nozzle head 6 towards nozzle 8.

During a filling operation of the printhead 100, the nozzle 8 is closed as required and when the piston 3 is actuated by the actuator device 110, the material 10, 11, 12 arranged in the cavity 40 and melting cavity 81 is compressed by the piston advancing.

The nozzle head 6 comprises the heating elements 61, 63 of the printhead 100, wherein a first heating element 61 is arranged in the upper nozzle head 60 and a second heating element 63 is arranged in the lower nozzle head 62. The upper nozzle head 60 has a subsection 64 arranged between the upper 60 and lower 62 nozzle heads, against which the pocket piece 7 rests. In the area of the nozzle 8, a cooling ring 84 is arranged on the nozzle head 6. This cools the component to be printed and it thermally shields the component from the printhead 100.

The heating elements 61, 63 in the nozzle head 6 heat the material 10, 11, 12 within the cavity 40, the pocket piece 7 and the melting cavity 82 until the liquid phase 12 of the material has reached its process temperature and can be discharged from the nozzle 8. The melt cavity 82 is configured to taper from the sub-portion 64 of the upper nozzle head 60 to the nozzle 8.

Furthermore, the printhead 100 comprises further sensors, wherein a pressure sensor 83 for the pressure $p_L$, and a temperature sensor 82 for the temperature $T_L$ of the liquid phase 12 of the material are arranged in the melt cavity 81. Further sensors are arranged on the actuator device 110, wherein a travel measurement system 111 for the position s of the piston 3, and a sensor 112 for the force F applied by the piston 3 to the material 10, 11 or for a hydraulic pressure $p_H$ applied to the piston 3 are provided. In an alternative embodiment, the sensors 111, 112 can also be arranged on the piston 3 of the printhead 100.

The printhead comprises an evaluation unit (not shown) to evaluate the measured values of the sensors 36, 82, 83, 111, 112 and to pass the results on to the control and regulation unit 113 for active control of the actuator device 110 and for active control of the heating elements 61, 63.

The control and regulation unit 113 is provided for active regulation of the actuator device 110 for moving the piston 3 according to an operating strategy to be executed for filling and printing, and for active regulation of the temperatures of the first 61 and second 63 heating elements.

The sensor signals received by the evaluation unit and the results calculated from the respective values are decisive for the active regulation of the actuator device 110.

The pressure sensor 83 for the pressure $p_L$, and the temperature sensor 82 for the temperature $T_L$ of the liquid phase 12 are arranged in the melting cavity 81. The displacement measuring system 111 for the position s of the piston 3, and the sensor 112 for the force F exerted by the piston 3 on the material 10, 11 or for a hydraulic pressure $p_H$ exerted on the piston 3, are arranged on the actuator device 110 or on the piston 3.

Furthermore, the temperature sensor 36 for the temperature $T_K$ of the plastic phase 11 of the material is arranged on the piston 3.

The signals s, F, $P_H$, $T_K$, $T_L$, $p_L$ of the sensors 111, 112, 36, 82, 83 are transmitted to the evaluation unit, subsequently evaluated in this unit or in a cloud, and the results are transmitted to the control and regulation unit 113 as a control variable i according to an operating strategy, and the actuator device 110, as well as the heating elements 61, 63, are actuated accordingly.

Figure 2:
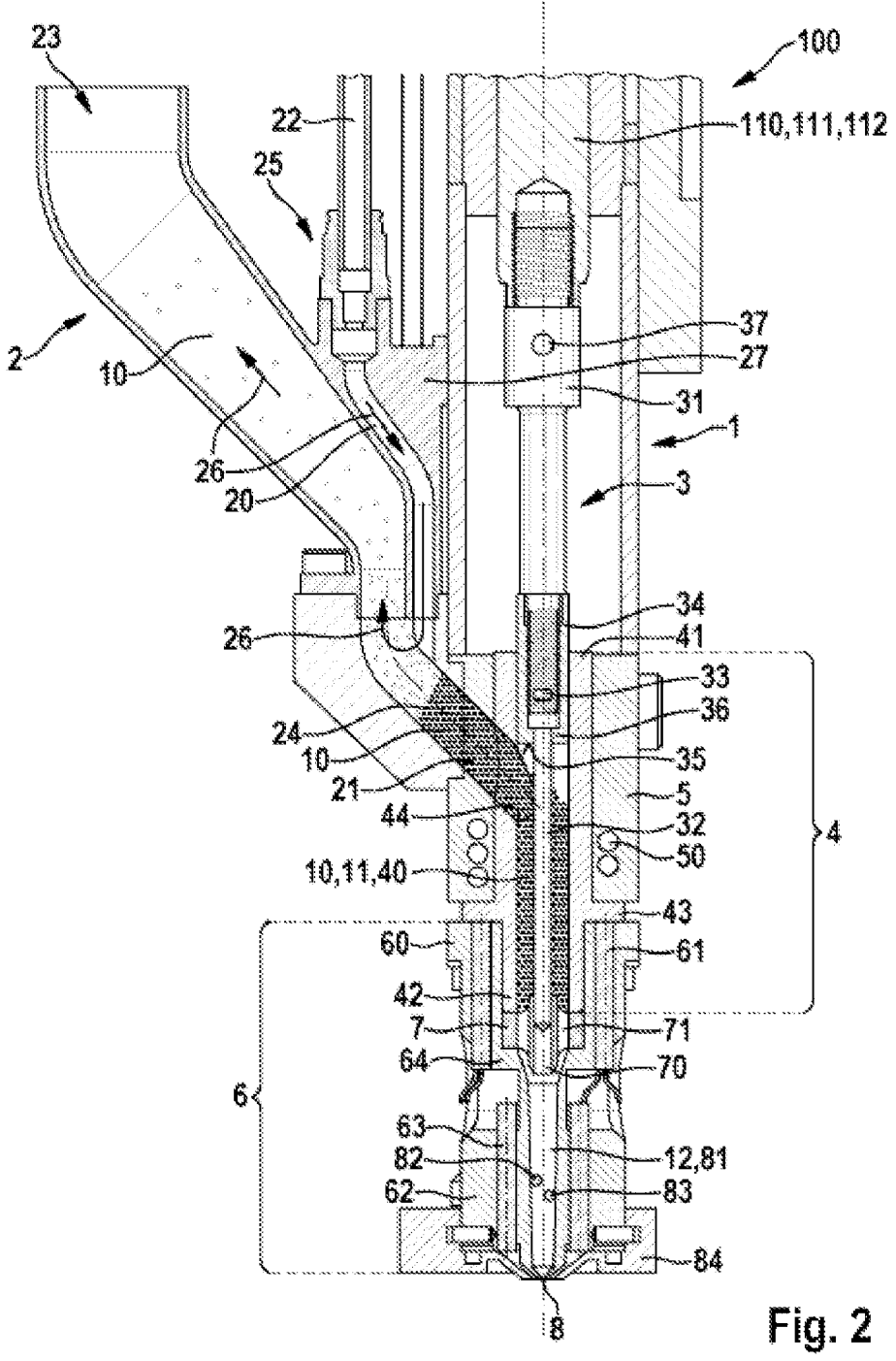
FIG. 2 a further illustration of the printhead according to the invention.

FIG. 2 shows another embodiment of the printhead 100 according to the invention, wherein according to the invention the solid phase 10 of the material comprises the granulate particles 10 and the supply device 2 has the injection device 25 for detaching the granulate particles 10 from each other.

The injection device 25 comprises the pneumatic valve 22 and the air duct 20, wherein the air duct 20 is arranged in a housing part 27 of the supply device 2 and opens in a lower area 24 of the supply device 2 above the opening cross-section 21 of the flange 5.

Air pulses 26 can be applied to the air duct 20 by the pneumatic valve 22, wherein the air pulses 26 act on the granulate particles 10 in the lower area 24 in such a way that they separate from one another.

The supply device 2 is funnel-shaped, wherein the granulate particles 10 are fed from above into an opening 23 of the supply device 2. The material 10 reaches the opening cross-section 21 of the flange 5 up to the piston bushing 4, or the opening cross-section 21 of the piston bushing 4, by gravity. In the lower area 24 of the supply device 2 above the opening cross-section 21 of the flange 5, an air duct 20 of the injection device 25 is arranged. Air pulses 26 are applied to the air duct 20 by the pneumatic valve 22. The injection device 25 comprises the pneumatic valve 22 and the air duct 20, wherein the granules 10 are subjected to air blasts at intervals in such a way that the granules 10 are propelled in the direction of the area of the supply device 2 located further upstream and the individual granulate particles 10 are thereby detached from one another. When the injection device 25 is switched off, the granules 10 located in the lower area 24 of the supply device 2 fall into a cavity 40 of the piston bushing 4 when the opening cross-section 21 is open.

The injection device 25 of the supply device 2 thereby prevents jamming of the granulate particles 10, which prevents clogging of the supply device 2, and it ensures reliable filling of the piston bushing 4 with granulate 10. The process of refilling requires blowing behind the granules 10, creating an effect of lifting the granules so that they subsequently slide into the printhead 100. The whirling is necessary for an automated operation and the resulting gravity impulse, or impact, causes the granules 10 to slip.

Figure 3:
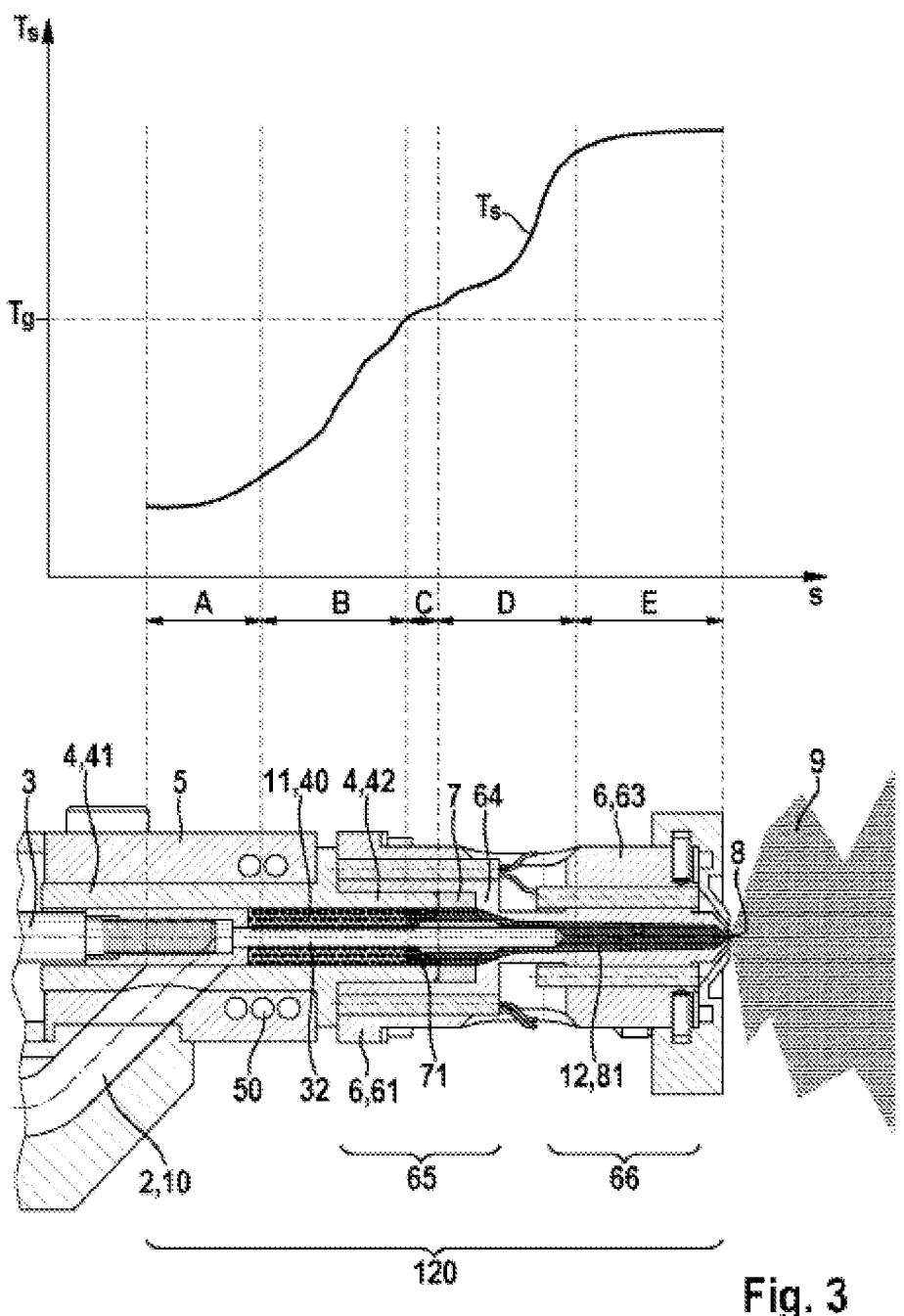
FIG. 3 a section of the printhead according to the invention.

FIG. 3 shows a section of the printhead 100 according to the invention in a view rotated by 90°, wherein starting from the upper partial area 41 of the piston bushing 4 via the pocket piece 7 up to the nozzle 8, state zones A, B, C, D, E of the printhead 100 filled with material 10, 11, 12 are shown during operation. The state zones A, B, C, D, E represent a state of aggregation of the material 10 as a function of its temperature $T_S$, wherein the state of aggregation of the material 10 is changeable across the state zones A, B, C, D, E from a solid phase 10 to a plastic phase 11 to a liquid phase 12.

The temperature $T_S$, or the temperature profile of the material 10, 11, 12 within the printhead 100 is shown in a diagram displayed above the printhead 100, wherein this is shown over the path s, or the length of a working area 120 of the printhead 100.

The state zones A, B, C, D, E of the printhead 100 comprise a cold zone A with material in solid phase 10, a plasticizing zone B with material in plastic phase 11, a melting zone D, and a process zone E in each case with material in liquid phase 12. Further, the state zones comprise a mixing zone C with material in plastic 11 and liquid 12 phases.

The cooling device 50 in the flange 5 and the piston cooling 33 integrated in the piston 3 are provided to keep the temperature $T_S$ of the plastic phase 11 of the material in the plasticizing zone B below a glass transition temperature $T_g$ even when the material 11 plasticizes and changes into a liquid phase 12. In the embodiments shown here, the plasticizing zone B with the material in plastic phase 11 describes a state of the material, or of the granules, in which the viscosity of the granules is already changing, thus optimizing a solidification and a mixing process, but the plastic phase 11 of the granules just does not yet change into the liquid phase 12.

Furthermore, the nozzle head 6 comprises two heating zones 65, 66.

In the first heating zone 65, a partial area of the plasticizing zone B, the mixing zone C and a partial area of the melting zone D are arranged, wherein a first heating element 61 is arranged in the upper nozzle head 60 in such a way that the heating energy from the first heating element 61 can be introduced into the material 10, 11, 12 via the lower partial area of the piston bushing 42, the pocket piece 7 and a partial section 64 of the upper nozzle head.

A partial area of the melt zone D and the process zone E are arranged in the second heating zone 66, wherein a second heating element 63 is arranged in the lower nozzle head 62 such that heating energy from the second heating element 63 can be introduced into the liquid phase 12 of the material via the lower nozzle head 62.

It can be seen from the diagram that the temperature $T_S$ of the material 10, 11, 12 increases steadily along the path s of the working area 120 of the printhead 100. In the cold zone A, the action of the cooling device 50 of the flange 5 is predominant, wherein the granules 10 are heated only slowly over the path s. From plasticizing zone B, the influence of the first heating zone 65 with the first heating element 61 begins to increase, with the temperature curve rising sharply until the glass transition temperature $T_g$ is reached, and from there the mixing zone C begins. The temperature $T_S$ continues to rise in the mixing zone C with a lower gradient until the melting zone D is reached. There, the influence zone of the second heating zone 66 begins with the second heating element 63, wherein the latter causes the temperature $T_S$ of the melt 12 to rise sharply until the process temperature of the melt 12 is reached in the process zone E and printable melt 12 has been produced.

The temperature $T_S$ must be set in such a way that the granules 10 can trickle into the cavity 40 during filling without sticking, but are also preheated in such a way that shearing of the material 10, 11 at the gate 44 is possible with as little force as possible. The temperature management of the printhead 100 is thereby adjusted so that the cooling device 50 in the flange 5 introduces a cooling temperature of about 40° C. into the piston bushing 4 and thereby into the material 10, 11, and the first heating element 61 of the first heating zone 65 introduces a heating temperature of about 30° C. below the glass transition temperature $T_g$, or the melt temperature of the material 10, 11, 12.

This effect is supported by the piston cooling 33. The cooling of the material 11, 12 at the piston crown 35 locally reduces the viscosity of the material 11, 12, causing it to detach from the piston 3 when it is retracted without drawing threads. This creates space for new material 10 when the piston 3 clears the opening cross-section 21 to the supply device 2.

The temperature sensor 36 at the piston crown 35 measures the temperature $T_K$ at the contact point of the piston 3 to the material 10, 11, wherein the cooling and heating power of the printhead 100 can be calculated so that the glass transition temperature $T_g$ of the material 10 is not exceeded. Due to the arrangement of the temperature sensor 36, or temperature sensor on the piston crown 35, it is possible to control the heating elements 61, 63 depending on the piston position and thus to adjust the temperature $T_S$. This results in faster heating of the material 11, 12. The thermal management of the printhead 100 thus also enables processing of plastics with low melting temperatures of less than 60 to 80° C.

During a solidification process to produce liquid phase 12 of the material in process zone E, nozzle 8 is closed. The nozzle 8 can be closed, for example, by a closure valve not shown, or by positioning the printhead 100 on a plate in the installation space of the printer. Furthermore, an already printed area of a component 9 can also be approached and the nozzle 8 thereby closed. During the solidification process, the piston needle 32 is immersed in the melt cavity 81 and continues to move into it in such a way that portions of the liquid phase 12 are thereby displaced from the melt zone D back into the mixing zone C, as a result of which the liquid phase 12 mixes with the plastic phase 11 from the plasticizing zone B in the mixing zone C.

The liquid phase 12 from the melt zone D is thereby displaced from the upper area of the melt cavity 81 through the openings 71 of the pocket piece 7 back into the cavity 40 of the piston bushing 4 into the mixing zone C.

Figure 4:
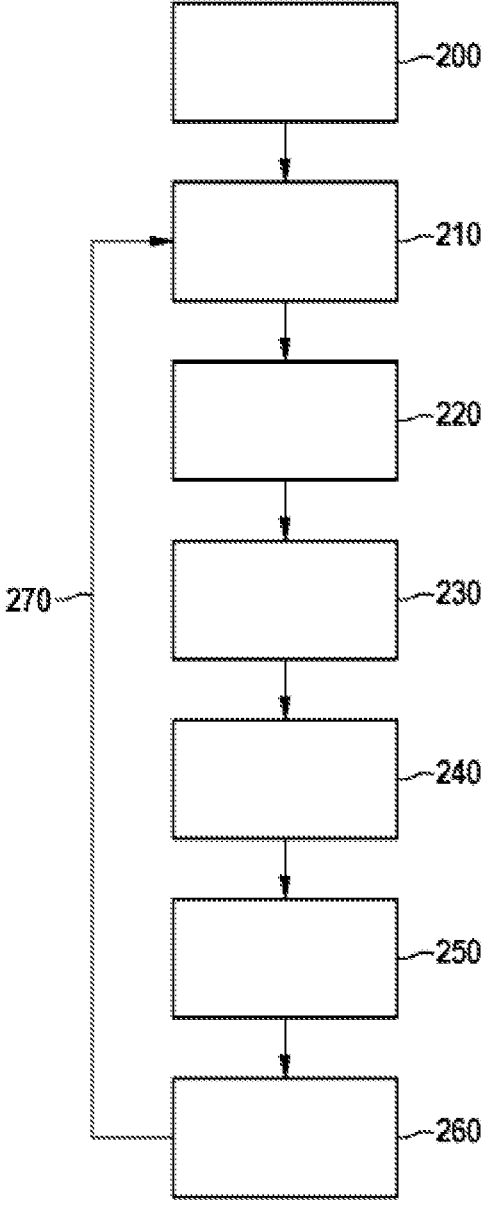
FIG. 4 a flow diagram of a method for operating the printhead according to the invention.

FIG. 4 shows a flowchart of a method 200 for operating the printhead 100 according to the invention, wherein the method 200 comprises the following steps:

filling 210 the cavity 40 with printable material 10 using the supply device 2, closing 220 an opening cross-section 21 of a piston bushing 4 by advancing or moving a piston 3 from a starting position 3a in the direction of a nozzle 8, solidifying 230 the material 10, converting 240 the material from a solid phase 10 to a liquid phase 12, discharging 250 the liquid phase 12 of the material from the nozzle 8 for printing a three-dimensional component 9 until an end position 3z of the piston 3 is achieved or until the completion of the component 9, retracting 260 piston 3 to start position 3a, and repeating 270 steps 210-260 until the termination of method 200.

At least the closing 220, the solidification 230, the converting 240 and the discharge 250 of the method 200 are carried out by an active regulation of the actuator device 110 by the control and regulation unit 113, wherein the results of the evaluation unit from the measured values of the sensors 36, 82, 83, 111, 112 are passed on to the control and regulation unit 113.

Figure 5:
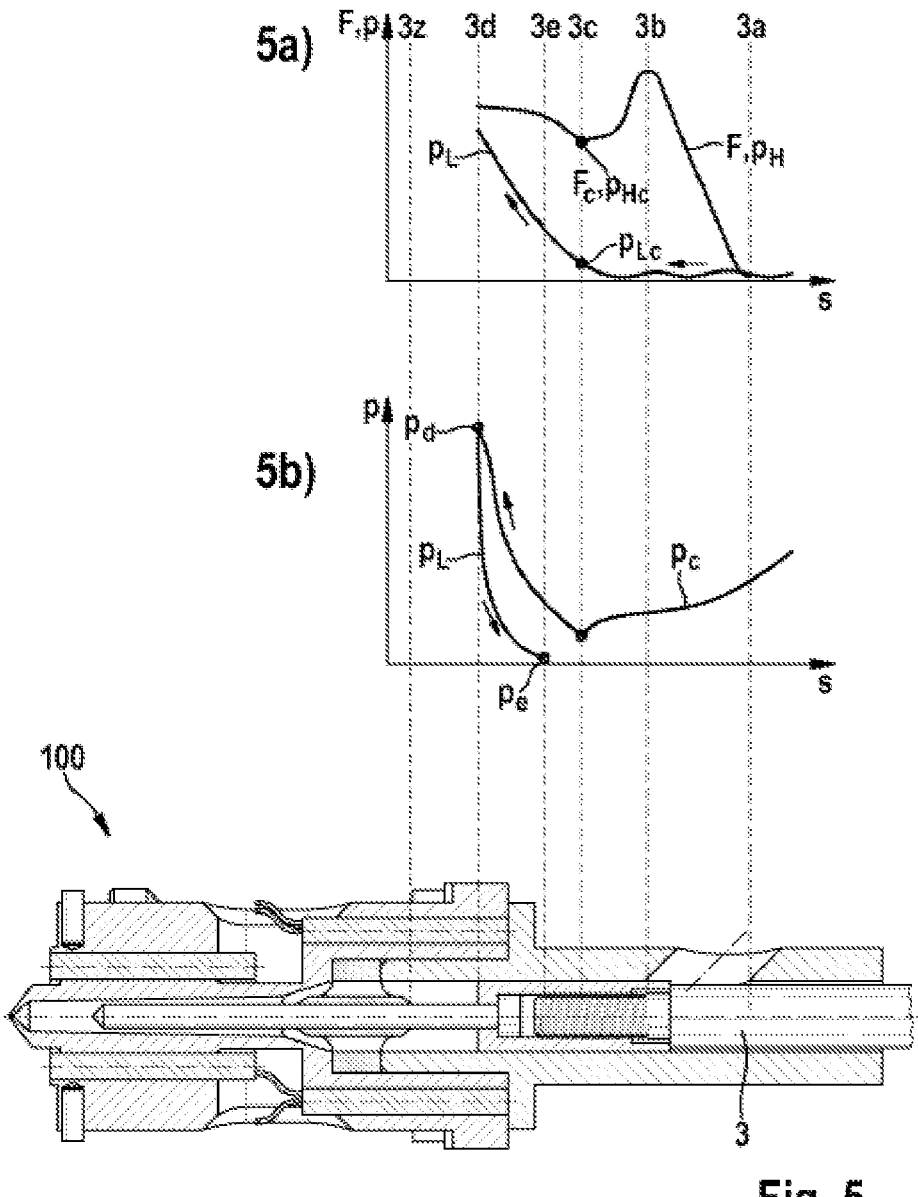
FIG. 5 a section of the printhead according to the invention with a pressure curve.
Figures 6, 6A, 6B, 6C, 6D, 6E:
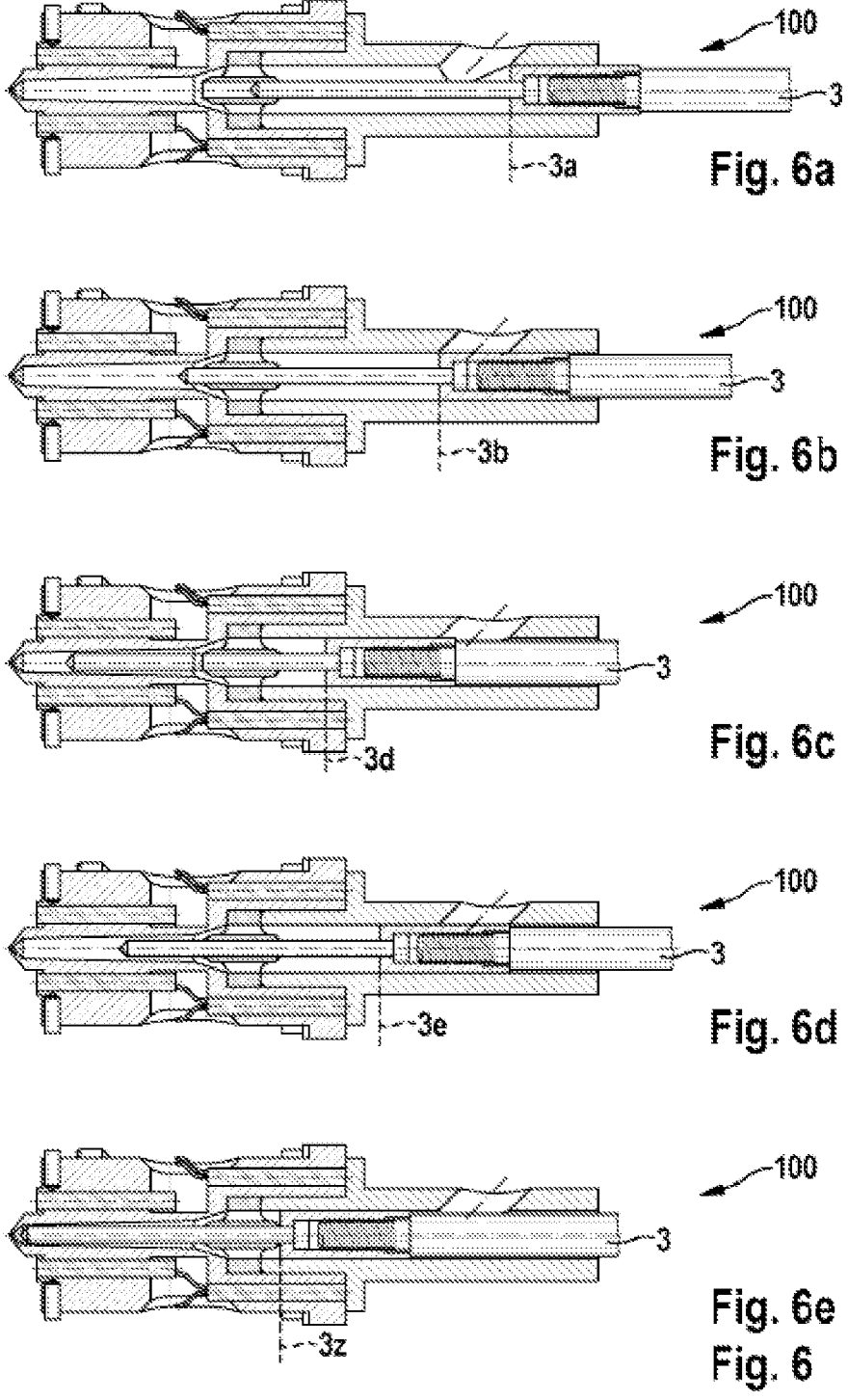
FIG. 6 different positions of a piston of the printhead according to the invention, and FIG. 7 a flow diagram of a method for operating the printhead according to the invention.

FIG. 5 shows a section of the printhead 100 according to the invention and two diagrams 5a, 5b, which illustrate a pressure, or pressure, force curve during operation, or various method steps of the method 200 for operating the printhead 100. FIG. 6 shows the different positions of the piston 3 at the different method steps or states from FIG. 5 starting at the start position 3a to the end position 3z of the piston crown 35. During the execution of the method steps, the cooling devices 50, 33 in the flange 5 and piston 3, as well as the heating elements 61, 63 are active and the melt cavity 81, as well as the pocket piece 7 are filled with melt 12 and in the lower partial area of the cavity 40 there are still granules in plastic phase 11.

The sections of the illustrated printhead 100 correspond to those of the printhead 100 according to the invention illustrated in FIGS. 1-3, so that the reference numbers of the previous figures are used to describe FIGS. 5 and 6, wherein new features and references, for example the respective position of the piston 3 with reference to the piston crown 35 are indicated in FIGS. 5 and 6.

FIG. 5 shows in the first diagram 5a two curves which are plotted over the distance s covered by the piston 3. The displacement s is measured by the displacement measuring system 111, or displacement sensor 111 on the actuator device 110 or on the piston 3.

The upper curve represents a force, pressure curve for the force F exerted by the piston 3 on the material 10, 11 or for the hydraulic pressure $p_H$ exerted on the piston 3 during the advancing of the piston 3 by the actuator device 110 during closing 220 and solidification 230, wherein the force, or pressure sensor 112 is arranged on the actuator device 110 or on the piston 3.

The lower curve in diagram 5a represents a pressure curve of the melt pressure $p_L$ in the melt cavity 81 over the path s of the piston 3 during solidification 230. The pressure sensor 83 for the pressure $p_L$ of the liquid phase 12, or the melt 12, is arranged in the melt cavity 81.

The second diagram 5b shows a partial section of the lower curve of the first diagram 5a, wherein here also the pressure curve of the melt pressure $p_L$ in the melt cavity 81 is shown over the path s of the piston 3 during solidification 230 (curve progression from $p_c$ to $p_d$).

FIG. 6a shows a start position 3a of the piston 3 during the filling process 210 of the printhead 100, wherein the piston crown 35 positioned at the top of the opening 21 of the piston bushing 4. The filling process 210 is also called the refill process, since it is a recurring sequence that is repeated at will during printing of a component 9. The position of piston 3 shown in FIG. 6a is analogous to the position of piston 3 in FIG. 1. The opening 21, or the opening cross-section 21 of the piston bushing 4 is open and the granules 10 can be introduced into the cavity 40 of the piston bushing 4 via the supply device 2. The piston 3 is then controlled by the actuator device 110 to the position 3b shown in FIG. 6b. The piston crown 35 slides past the gate 44 of the piston bushing 4 and the granules 10 protruding from the opening 21 into the cavity 40 are sheared off between the piston crown 35 and the gate 44. Therefore, this position is called shear position 3b. After shearing, the opening cross-section 21 is closed 220.

The force, pressure curve F, $p_H$ increases from the start position 3a to the shear position 3b, wherein the force applied by the actuator device 110 is highest at the gate 44, or shear position 3b, since the actuator device 110 must apply the force to shear the granules 10. The amount of force required can be reduced by suitable measures such as optimization of the gate geometry in conjunction with the nature of the piston crown 35 and preheating of the granules 10. The pressure curve $p_L$ of the melt 12, on the other hand, changes only slightly or hardly increases at all, since the nozzle 8 is still open and no pressure buildup occurs in the melt cavity 81.

Subsequently, the piston 3 is moved to position 3c by the actuator device 110 under force or pressure control. When the piston 3 is moved, the force F exerted on the material, or granules 10, 11, or the hydraulic pressure $p_H$ exerted on the piston 3, as well as the pressure $p_L$ in the melt 12 are measured.

Position 3c is defined by the increase in force or pressure, i.e. position 3c is actuated, wherein not a direct point but an edge of the curves shown in diagram 5a is actuated. The slope arises at a change point $p_{Lc}$, $F_c$, $p_{Hc}$ from in each case the straight line with low, or no slope (the area from position 3a to position 3c) to the slope of the curve (at position 3c), at which a predefined slope, or a predefined slope angle is reached and/or exceeded. Position 3c is located in the first third of plasticizing zone B. Granules 10, 11 are compressed in plasticizing zone B by the advancing of piston 3, wherein at the same time melt 12 is located in melting zone D between cavity 40 and nozzle 8. The plasticized granules 11 are thus forced into the melt 12 in the mixing zone C.

By lowering the piston 3 and, analogously, the piston needle 32 in the direction of the nozzle 8, melt 12 already emerges from the nozzle 8, thus ensuring that any air or air pockets that can still be present are displaced from the nozzle head 6. This frees up the nozzle 8.

The position 3c is provided with a tolerance due to the method and material, wherein the position 3c of the piston 3 can be slightly different for different fill processes of the printhead 100 carried out one after the other. Position 3c is therefore not a fixed point. If the position 3c is within the specified tolerance, it is ensured that the filling process 210 was successful, i.e. that enough granules 10 were filled into the cavity 40 and that the melt cavity 81 is already filled with melt 12. If, for example, the flank starts too far before position 3c, there is too much highly viscous, or hard, material 10, 11 in the area from the piston crown 35 to the nozzle 8, and the mixing process in mixing zone C cannot have been successful. If, for example, the flank does not start until well after position 3c, too little material 10 can have been added.

After reaching position 3c, the nozzle 8 of printhead 100 is closed.

Pre-solidification has been completed and, for solidification 230, the piston 3 is advanced in a pressure-controlled manner starting from position 3c until a predefined peak pressure pa is reached and the piston crown 35 has been moved to position 3d shown in FIG. 6c. The peak pressure pa can be between approx. 100 and 300 bar, depending on the material 10 and requirements.

Subsequently, the so-called peak pressure position 3d is held for a material-dependent predefined period of time. In this case, the piston crown 35 projects into the first heating zone 65 and the piston needle 32 projects into the melting cavity 81, and during holding, a portion of the melt 12 flows from the melting cavity 81 of the nozzle head 6 through the openings 71 of the pocket piece 7 back into the mixing zone C into the plastic granules 10 located there. This displaces residual air and homogenizes melt 12 in mixing zone C. This results in a better energy flow and produces a more homogeneous material 11, 12. The refluxing melt 12 becomes plastic and the granules 11, which are pushed into the pocket piece 7, become melt-like. This results in mixing of the material 11, 12.

The holding process described here is also used to analyze and perform a system check of the printhead 100, as the following effects can occur when measuring the pressure $p_L$. An increase in the pressure $p_L$ in the melt 12 would mean that the melt 12 is outgassing because, for example, the temperature $T_L$ is too high. Too high melt temperatures $T_L$ are not desired, since air plasma can develop, which would lead to chemical decomposition.

A sharp drop in melt pressure $p_L$ could mean, for example, that the system of printhead 100 is leaking or that there was still too much air in the system. This effect could occur if, for example, too much cold material 10, 11 was present in the cavity 40 because the temperature management of the printhead 100 was not optimally adjusted.

After the predefined time period has elapsed, the piston 3 is moved back from the peak pressure position 3d by the actuator device 110 in a pressure-controlled manner until a target pressure $p_e$ of approx. 0 bar is reached. The system is relaxed. This ensures that the melt 12 is depressurized and vented, resulting in a pure melt 12, especially in process zone E, which is now of high quality and printable. When the target pressure $p_e$ is reached, the target pressure position 3e shown in FIG. 6d is reached, wherein the piston crown 35 positioned outside the first heating zone 65 in the area of the stop 43 of the piston bushing 4.

The pressure difference now measured between the pressure pa of the peak pressure position 3d and the pressure $p_e$ of the target pressure position 3e and the distance s traveled between the two points 3d, 3e yields a spring constant of the liquid phase 12 of the material, or melt 12.

The spring constant results from the compressibility of the melt 12 and leads to a correction factor, or shape factor, which is needed to accurately control the piston 3 by the actuator device 110.

Due to the compressibility of the melt, for example, 1.2 volume units of a geometric piston travel s covered by the piston 3 correspond to 1.0 volume units of a discharged volume of the melt 12. Without compressibility, the ratio would be 1:1.

This makes it possible for the actuator device 110 to actuate the piston 3 in a controlled manner, wherein the spring constant makes it possible, among other things, for the real discharge of the melt 12 to achieve the correct, calculated volume flow of the melt 12 as a function of a path speed of the moving printhead 100 during printing. This means that at each printing position, the required amount of melt 12 in each case is applied to the component 9 at each web speed of the printhead 100.

Subsequently, the printing process 250 is prepared via an active decompression by a retraction of the piston 3.

Depending on the spring constant determined, the piston 3 is retracted by approx. 1 to 2 millimeters, which ensures that no melt 12 escapes from the nozzle 8, or nozzle opening, when it is subsequently opened. This would be the case if position 3e were to continue to be held due to the existing open system due to the influence of gravity. At the same time, the melt 12 is relieved of pressure in the same way as a spring.

Then further preparation by compression begins.

The overall system of the printhead 100 is a compressible system, as previously described, since the melt 12 can have a compression of about 20%, for example. Therefore, the volume displaced by the advancing of the piston 3 does not correspond to the volume of the discharged material 12, which can result in inaccurate and irregular discharges. The possible volume of melt 12 for an advancing of the printing process 250 is defined by the target position 3e and the path to the end position 3z shown in FIG. 6e.

Due to the effect described above, the melt 12 is compressed during the start of printing. The compression of the melt 12 in the melt cavity 81 at the start of printing is generated in part by friction at the nozzle opening of the nozzle 8 as the melt 12 is "squeezed out", and in part by resistance to printing on the component 9 or a substrate support on which the component 9 is built.

Uniform discharge of the melt 12 is achieved by intelligent regulation of the printhead 100, wherein asynchronous movements of the piston 3 adjusted by a correction factor through the use of an electronic gear on the actuator device 110. The correction factor, which results in particular from the determined spring constant of the melt 12, is mixed into the system, so to speak. Therefore, the printhead 100 according to the invention has no restriction on synchronous movements analogous to common NC systems.

The printing process 250 is pressure-controlled, wherein the pressure $p_L$ of the melt 12 being permanently measured by the pressure sensor 83 in the nozzle head 6. The measured pressure $p_L$ is the pressure that results from the discharge of the melt 12 onto the component 9, or onto the substrate carrier (if there is no component yet). Without this effect of printing on an object, there would be no back pressure on the nozzle 8, other than that of a frictional pressure, which would cause too much material/melt 12 to be discharged from the nozzle 8.

The printing process 250 is started by actively mixing in melt 12 through the intelligent regulation and actuation of piston 3. In this case, "more" stroke is performed to compensate for the compressibility of the melt 12. In principle, too much melt 12 is pressed out of the nozzle 8, but the pressure sensor 83 is read out parallel to the mixing of the melt 12, wherein corresponding pressure-dependent countermeasures can be taken.

An electrically driven actuator device 110 proves to be dynamic and very effective for this case.

During the printing process 250, the melt temperature $T_S$ is continuously measured and, in the heating zone 2, the melt 12 is controlled to the required target value of the process temperature in the area of the process zone E via the heating elements 63 in the nozzle head 6.

The piston 3 is actuated by the actuator device 110 to start printing in accordance with a path speed of the printhead 100, causing melt 12 to be discharged from the nozzle 8.

During the printing process, the control and regulation unit 113 of the printhead 100 is activated and actively intervenes in the actuation of the actuator device 110, for example, to add an additive target value, or an additive amount of material 12, as required. If, for example, an additive target value is added and thus more material 12 is discharged or extruded from the nozzle 8 than by continuous actuation, the pressure p at the nozzle head 6 also increases as a result. The additive target value is the mixed-in value, or the additional piston travel that must be covered in order to discharge the desired volume of melt 12 in accordance with the correction value, determined from the spring constant. As a result, a steady state is achieved, wherein the amount of melt 12 discharged onto the component 9 remains constant.

As a result of advancing the piston 3 and the resulting pressure increase in the melt 12, the virtual "spring" of the melt 12 becomes smaller or stiffer. This resulting technical effect is re-regulated by the control and regulation unit 113, whereby the exact amount of melt 12 is further discharged from the nozzle 8 during the printing process 250.

The use of the piston needle 32 provides the advantageous effect that direct volume displacement is possible within the melt 12 in the melt cavity 81, thereby achieving a smaller spring constant. The small spring constant in turn enables the printhead 100 to be highly dynamic. The effect results from the fact that a more direct pressure transfer to the melt 12 occurs through the piston needle 32. Thus, as the piston 3 advances, not only does the piston crown 35 transmit a pressure pulse to discharge the melt 12 from the nozzle 8, but also the piston needle 32, which is positioned closer to the nozzle 8.

The printing process 250 can be carried out to a maximum until the piston crown 35 reaches position $3z$, wherein position $3z$ is determined in such a way that the piston crown 35 just does not reach a mechanical stop, but comes to a stop shortly before reaching the pocket piece 7, as shown in FIG. 6e. After that, no more material 12 can be discharged and the fill process 210 or refill process described above is started again.

Figure 7:
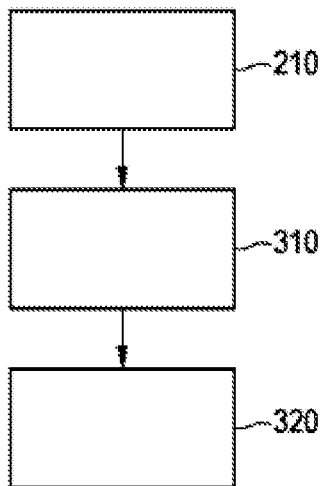

FIG. 7 shows a flow diagram of a method for filling 210 the printhead according to the invention, wherein a heatable cavity 40 of the printhead 100 is filled with printable material 10 by means of the supply device 2.

Filling 210 the cavity 40 with printable material 10 by the supply device 2 comprises the following steps:

filling 310 the granulate particles 10 into the printhead 100 via the opening 23 of the supply device 2 and generating 320 air pulses 26 to detach the granulate particles 10 from each other.

The feeding 310 of the granulate particles 10 is performed manually or automatically, wherein the granulate particles 10 slide into the lower area 24 of the supply device 2 due to the influence of gravity.

The generation 320 of air pulses 26 is performed at intervals and the granulate particles 10 are thereby ejected in the area of the air pulses 26 such that they exert a pulse on the underlying granulate particles 10 upon falling again and stimulate them to slip into the heatable cavity 40 of the printhead 100.

The invention claimed is:

1. A printhead (100) for a 3D printer comprising: an actuator device (110) arranged in a housing (1) of the printhead (100) for actuating a piston (3), a supply device (2) for a printable material (10), a flange (5) with a cooling device (50), the flange being arranged at the housing (1) and the supply device (2), a nozzle head (6) with heating elements (61, 63) for converting the material (10) from a solid phase (10) into a liquid phase (12), and a nozzle (8) for discharging the liquid phase (12) of the material (10) out of the nozzle head (6), wherein the solid phase (10) of the material has granulate particles (10) and the supply device (2) has an injection device (25) for detaching the granulate particles (10) from one another, wherein the injection device (25) includes an air duct (20) that is arranged in a housing part (27) of the supply device (2) and opens in a lower area (24) of the supply device (2) above an opening cross-section (21) of the flange (5) into which the printable material (10) flows from the supply device (2), the opening cross-section (21) of the flange (5) is arranged in an upper partial area of a piston bushing (4) that is configured to guide the piston (3).

2. The printhead (100) according to claim 1, wherein the injection device (25) comprises a pneumatic valve (22).

3. The printhead (100) according to claim 2, wherein air pulses (26) can be applied to the air duct (20) by the pneumatic valve (22), wherein the air pulses (26) act on the granulate particles (10) in the lower area (24) in such a way that the granulate particles detach from one another.

4. A method (210) for filling a printhead (100) according to claim 1, wherein a heatable cavity (40) of the printhead (100) is filled with printable material (10) by the supply device (2).

5. The method (210) according to claim 4, wherein filling (210) of the cavity (40) with printable material (10) by the supply device (2) comprises at least the following steps:

filling (310) the granulate particles (10) into the printhead (100) via an opening (23) of the supply device (2), and generating (320) air pulses (26) to detach the granulate particles (10) from each other.

6. The method (210) according to claim 5, wherein the filling (310) of the granulate particles (10) is carried out manually or automatically, wherein the granulate particles (10) slide into a lower area (24) of the supply device (2) due to the influence of gravity.

7. The method (210) according to claim 6, wherein the generation (320) of air pulses (26) is carried out at intervals and the granulate particles (10) are flung up in an area of the air pulses (26) in such a way that, as they fall, they exert an impulse on the granulate particles (10) lying underneath and encourage the granulate particles lying underneath to slide into the cavity (40) of the printhead (100).

8. The printhead (100) according to claim 2, wherein the piston (3) defines a longitudinal axis, wherein the pneumatic valve (22) is oriented parallel to the longitudinal axis.

9. The printhead (100) according to claim 2, wherein the air duct (20) is entirely above the opening cross-section (21).

\* \* \* \* \*